United States Patent [19]

Salyer et al.

[11] 3,959,197
[45] May 25, 1976

[54] USE OF SOLVENT MIXTURES IN MAKING FOAMABLE COMPOSITIONS

[75] Inventors: Ival O. Salyer; James L. Schwendeman, both of Dayton, Ohio; Robert T. Jefferson, Columbus, Ind.

[73] Assignee: Monsanto Research Corporation, St. Louis, Mo.

[22] Filed: Sept. 6, 1974

[21] Appl. No.: 503,903

Related U.S. Application Data

[63] Continuation-in-part of Ser. No. 406,993, Oct. 16, 1973, abandoned, which is a continuation of Ser. No. 201,145, Nov. 22, 1971, abandoned, which is a continuation-in-part of Ser. No. 877,459, Nov. 17, 1969, abandoned.

[52] U.S. Cl. .......................... 260/2.5 E; 106/122; 106/196; 260/2.5 B; 260/2.5 F; 260/2.5 H; 260/2.5 N; 260/2.5 R; 260/2.5 AK; 260/2.5 BE; 260/2.5 HA; 260/2.5 HB; 260/30.4 A; 260/30.4 R; 260/33.2 R; 260/33.6 UA; 260/33.8 R; 260/33.8 UA; 260/33.8 UB
[51] Int. Cl.$^2$.................... C08J 9/16; C08K 5/01; C08K 5/02; C08K 5/15
[58] Field of Search........................ 260/2.5 B, 2.5 E

[56] References Cited
UNITED STATES PATENTS

| | | | |
|---|---|---|---|
| 2,354,260 | 7/1944 | Haney et al............................ | 764/53 |
| 2,450,436 | 10/1948 | McIntire........................ | 260/2.5 E X |
| 2,978,340 | 4/1961 | Veatch et al....................... | 260/2.5 B |
| 3,442,828 | 5/1969 | Engelhardt et al............. | 260/2.5 HB |
| 3,632,703 | 1/1972 | Sullivan et al.................... | 260/2.5 B |
| 3,644,230 | 2/1972 | Cronin ............................. | 260/2.5 E |
| 3,657,165 | 4/1972 | Kawai et a. ...................... | 260/2.5 E |

OTHER PUBLICATIONS
"Evaluation of Four Foaming Techniques", Salyer et al., Journal of Cellular Plastics, Vol. 4, No. 9, Sept. 1968, pp. 1-12.

*Primary Examiner*—Murray Tillman
*Assistant Examiner*—Thurman K. Page
*Attorney, Agent, or Firm*—Bruce Stevens

[57] ABSTRACT

A process for rapidly producing a substantially uniform, solid, cellular thermoplastic article comprising the steps of: (a) charging a vessel with (1) a solid thermoplastic polymer, (2) a solvent mixture the amount of which in the range of from about 25-50% by weight of said polymer boils at or below 0°C. and to prevent shrinkage the minor amount of which in the range of from about 3-30% by weight of said polymer boils at or near 20°C., said solvent mixture being capable of forming a gel with the polymer when subjected to super-atmospheric pressure, (3) water in sufficient amount to lubricate the flow of the gel from the vessel as specified in step (c) below, and (4) for homogeneous polymer solutions a nucleating agent selected from the group consisting of spherical polyethylene powder, glass hollow spheres, phenolic hollow spheres and mixtures thereof; (b) subjecting the contents of the vessel to super-atmospheric pressure at a temperature in the range of room temperature to below the critical temperature of said solvent mixture for a time sufficient to form a flowable gel; and, (c) thereafter rapidly opening an outlet at the bottom of the vessel to cause the gel to flow from the vessel and form the cellular article. Foamable compositions usable in the process to make the cellular articles are described. Major means more than 50% by weight of the solvent mixture and minor means less than 50% by weight of the solvent mixture as the terms imply.

26 Claims, No Drawings

USE OF SOLVENT MIXTURES IN MAKING FOAMABLE COMPOSITIONS

This invention was made in the course of, or under, a contract with the Department of the Navy.

CROSS REFERENCE TO RELATED APPLICATION

This application is a continuation-in-part of application Ser. No. 406,993, filed Oct. 16, 1973, now abandoned; which is a continuation of application Ser. No. 201,145, filed Nov. 22, 1971, now abandoned; which is a continuation-in-part of application Ser. No. 877,459, filed Nov. 17, 1969, now abandoned.

BACKGROUND OF THE INVENTION

This invention pertains to a process for the preparation of porous or cellular resinous bodies.

Previously, U.S. Pat. No. 2,450,436 issued Oct. 5, 1948 to O. R. McIntire disclosed the method of producing a plastic cellular article by charging a vessel with a solid thermoplastic polymer, e.g. polystyrene, together with a normally gaseous agent capable of being dissolved by the polymer, subjecting the mixture to superatmospheric pressure—to form a gel of the polymer—and opening an outlet—so as to cause the gel to flow from the vessel. The invention is restricted to release of the pressure on the solution at a time when the latter is at a temperature preferably between 50° and 125°C.

The use of certain specific nucleating agents in controlling pore size of polystyrene foamed articles is claimed in U.S. Pat. No. 3,188,295 issued June 8, 1965 to D. E. Ballast et al, wherein the organic pigments indigotin and blue copper phthalocyanine are shown. Furthermore, in U.S. Pat. No. 3,224,984 a relatively low molecular weight (1000–4000) polyethylene wax is used as nucleating agent.

A combination of nucleating agents, wetting agents and a foaming agent was taught in U.S. Pat. No. 3,413,387 to E. O. Ohsol, but his nucleating agents were made up of two materials which react to form carbon dioxide and water, and the foaming agent was absorbed on an absorbent. The use of polystyrene as a nucleating agent for foamed polyethylene was taught in U.S. Pat. No. 3,065,190 to D. S. Chisholm et al.

In Cellular Plastics, 4, No. 9, September 1968, "Evaluation of Four Foaming Techniques for Inflating a PK-Life Raft", by I. O. Salyer, J. L. Schwendeman and C. E. McClung, compositions are described similar to those of the invention, but without the critical feature of the particular nucleating agents required for certain polymers to produce foams of small and uniform cell size.

Despite the advances made in the prior art, we have found that the prior art methods yielded foams of widely varying cell size, usually with cells larger than desired, and consequently, of relatively low compressive strength. Additionally, the foams frequently shrink, or even collapse, or the blowing agent volatilizes before the foam hardens sufficiently to support its own weight.

Furthermore, the use of organic pigments as nucleating agents yielded colored products which are limited in utility.

Last, but not least, the products of this invention can be prepared at room temperature, and do not require the elevated temperature required by the prior art. Consequently, these foams can be generated in areas remote from complex processing equipment, and require only a valved pressure vessel for containment until ready for use. The foam can even be discharged incrementally from the pressure vessel with prolonged periods of time between each release.

The products of the present invention are useful for flotation devices, for packaging of delicate equipment, for emergency splints for personal injuries, for thermal insulation, for closing openings, for decorative purposes, etc. The foam is generally low-density with predominately closed-cell structure having high compressive strength and dimensional stability, with small uniform cells. Its whiteness makes it attractive for aesthetic reasons. However, it may be dyed readily, as by adding a soluble dye such as Congo Red or Brom Cresol Green in suitable concentration to the foamable mixture, e.g. 0.2–2.0% by weight of the solid foam.

SUMMARY OF THE INVENTION

An object of the invention is to produce a uniform low-density cellular structure from a styrene homopolymer or copolymer, vinyl chloride/vinyl acetate copolymers, and polyvinyl acetate. A further object is to provide a predominately closed-cell foam having high compressive strength and dimensional stability, and containing small uniform cells. Still a further object is to provide a white foam matrix to which organic and inorganic colorants can be added if desired.

These and other objects hereinafter defined are met by a process or method of producing a substantially uniform, solid, cellular thermoplastic article wherein the steps comprise charging a vessel with (1) a solid thermoplastic polymer, (2) a solvent mixture the amount of which in the range of from about 25–50% by weight of said polymer boils at or below 0°C. and to prevent shrinkage the minor amount of which in the range of from about 3–30% by weight of said polymer boils at or near 20°C., said solvent mixture being capable of forming a gel with the polymer when subjected to super-atmospheric pressure, (3) water in sufficient amount to lubricate the flow of the gel from the vessel as specified in step (c) below, and (4) for homogeneous polymer solutions a nucleating agent selected from the group consisting of spherical polyethylene powder, glass hollow spheres, phenolic hollow spheres and mixtures thereof; (b) subjecting the contents of the vessel to superatmospheric pressure at a temperature in the range of room temperature to below the critical temperature of said solvent mixture for a time sufficient to form a flowable gel; and, (c) thereafter rapidly opening an outlet at the bottom of the vessel to cause the gel to flow from the vessel and form the cellular article. Foamable compositions usable in the process to make the cellular articles are described. Major means more than 50% by weight of the solvent mixture and minor means less than 50% by weight of the solvent mixture as the terms imply.

In its narrower aspects, the compositions of the invention are as follows: The solution of the amorphous polymer has a solubility parameter (defined in J. Appl. Chem., 3, February 1953, page 73) between 8.4 and 10.4, and a molecular weight as measured by intrinsic viscosity between 0.5 and 5 and preferably about 1; dissolved at 40 to 80% solids, preferably at 60 to 70% solids, in a solvent system consisting of a major amount of a low boiling solvent such as dimethyl ether and methyl chloride, and a minor portion of a solvent which boils near room temperature such as Freon 11, Freon 21, chloroform, or ethylene oxide; plus 0.5 to 25 parts, and preferably 5 to 10 parts of an annionic surfactant containing about 25% water; plus a nucleating agent selected from the group consisting of glass microballoons, phenolic microballoons and micronized polyethylene.

The process itself consists of venting or depressurizing the polymer solution as described above through a straight-thru ball valve or similar nonconstricting, quick-opening valve into air, into a closed vented mold, or onto any solid or liquid surface, stationary or moving.

The requirement for the polymer is that it shall be soluble, at high solids concentration, in a very low boiling solvent such as methyl chloride and dimethyl ether.

To be soluble in these solvents, the polymer should have a solubility parameter between 8.4 and 10.4.

The polymer used must be of high molecular weight having an intrinsic viscosity value between 0.5 and 5.0 and preferably about 1.0.

The polymer must be amorphous in the sense that it cannot contain a significant quantity of a crystalline phase which prevents solubility at or near room temperature. Polyethylene, polypropylene, Nylon 6 or 66, and polyformaldehyde are examples of crystalline polymers not suitable for preparation of instant foams.

The polymers used for preparing instant foam must not contain high percentages of gel or be crosslinked during polymerization. Although butadiene/styrene copolymers are listed above as one of a group of polymers suitable for the practice of this invention, not all butadiene/styrene copolymers or polybutadienes are suitable. As is well known in the rubber industry, many of the diene type polymers crosslink and develop gel content if taken to high conversion during polymerization. For many rubber applications this gel or crosslink material is not objectionable. However, for preparing instant foams, the polymer should preferably be completely soluble.

The range of solids content of polymer which can be used in preparing instant foams which do not collapse, is limited to the range of 40 to 80% solids, and preferably about 60 to 70% solids. The density of the product foam is inversely related to percent solids and ranges from 0.6 to 6 lb/ft$^3$.

As the major solvent we prefer either dimethyl ether or methyl chloride. These two solvents both have boiling points around −25°C. and a vapor pressure of about 60 psig at room temperature. The low boiling point and the 60 psig vapor pressure at room temperature which is obtained with these two specific solvents are not matched by many other organic compounds. Additionally, these solvents have solubility parameters of around 9.3, and therefore will dissolve polymers having solubility parameters from 8.4 to about 10.4. All of the soluble non-crystalline, noncrosslinkd organic polymers listed as suitable for this process do indeed have solubility parameters in this range.

Importantly, inert gases such as air, $N_2$, $CO_2$, and nitrous oxide, can be used as auxiliary pressurizing gases in order to extrude the higher density foam formulations at a faster rate, or at lower temperatures than would otherwise be possible.

In order to prevent shrinkage of instant foam, whether made of polystyrene or another polymer or copolymer, it is necessary to have a suitable co-solvent whose boiling point is preferably at or near room temperature. The purpose of this second minor solvent is to prevent shrinkage by diffusing out of the polymer foam matrix into the gas space after the foam has been blown, and thus supply the pressure (equal to ambient) required to keep the foam inflated as the low boiling major solvent diffuses fairly rapidly out of the foam. If the secondary solvent had a boiling point significantly above ambient, it could not fulfill this function. If the secondary solvent had a boiling point much lower than room temperature it would probably escape from the blown foam at about the same rate as the major solvent and therefore would not prevent shrinkage. Minor co-solvents of this type, which boil near room temperature include, but are not limited to, Freon 11, Freon 21, chloroform, ethylene oxide and diethyl ether. Certain hydrocarbons such as pentane, cyclopentane, and butadiene are valuable as minor co-solvents for low solubility parameter alkyl hydrocarbon type polymers such as polyisobutylene, butyl rubber, polybutadiene, and butadiene/styrene copolymers.

In the absence of a suitable surfactant and/or water, the foam produced from an otherwise good formulation of polymer and solvents is of very poor quality having large and uneven cells. Furthermore, the foam does not extrude well from a bottle or other container. The surfactant and/or water has an equal or more important function of lubricating the container walls and discharge valves and pipes and thus facilitating flow of the foam solution. The preferred surfactant at this time is Triton X-200, an aqueous solution of the sodium salt of an aryl alkyl polyether sulfonate. It is very necessary for the water to be present in the surfactant. Experiments in which Triton X-200 was vacuum dried in order to remove the water produced foam of very poor quality. Adding the water alone, without any Triton X-200, produced better quality foam than when the water was omitted but not as good as with the combination of anionic surfactant and water. We do not believe that suitable surfactants should be limited to Triton X-200 since other similar anionic surfactants to which a comparable amount of water is added should work equally well. It is likely that cationic and nonionic surfactants to which water is added will also make suitable surfactants.

In addition to a suitable surfactant, a separate nucleating agent is required in order to obtain high quality solvent blown foam having a small and uniform cell size. In homogeneous polymer solutions, such as polystyrene, styrene acrylonitrile copolymers, or polyvinyl acetate, the use of a finely divided particulate nucleating agent such as glass microballoons, phenolic microballoons, or finely divided polyethylene is very beneficial to the production of smaller and more uniform celled foams than obtained with surfactant alone. Of the nucleating agents tested, the glass microballoons appear to be the most generally useful.

However, in non-homogeneous polymer systems, that is polyblend and graft copolymers, such as high impact polystyrene and ABS, the use of glass microballoon or other nucleating agents is not necessary, and in some instances may be disadvantageous to obtaining small cell size uniform foams.

For extruding the instant foam solution to form product of uniformly small cell size, the design of the orifice and valve is critical. For example, a needle-type valve which is opened gradually will literally tear up the foam and disrupt its structure as it is flowing around the needle valve. Preferably a straight-thru ball valve in which the opening is the same diameter as the orifice immediately prior to and after the valve is the most desirable arrangement. A gradual narrowing down from the pressure cylinder to the orifice is also highly desirable. A pressure cylinder which has the general configuration of an "S" curve with gradual transition from straight to curved sections and a gradual transition between the curved surfaces.

The important considerations then are that there should be a smooth and gradual reduction from the diameter of the pressure cylinder to the configuration of the orifice. However, it is not necessary that only round orifices be used. Square, triangular, or other shaped orifices can also be used with the same limitations as already stated for the orifice and valve.

The pressurized container in which the final solution is packaged should preferably be fitted with either a dip tube or a bottom entry port in order to permit the use of separate extra pressurizing gases such as nitrogen and the others already listed. This modification to the pressurized dispensing cylinder is necessary or desirable only in order to obtain faster rates of extrusion of the higher density foams, or fast rates of extrusion at low temperatures.

Instant foam can be extruded through a multiplicity of orifices in order to form small diameter strands of foam, or spagetti which could conveniently be generated on site for packaging applications.

Instant foam can be extruded as a round or other shaped log of foam onto the surface of water, in order to form a floating dam, a bridge, or sections of foam for pontoons, life rafts, etc.

Conceivably, the instant foam could also be extruded as a thick sheet and laminated immediately after exit from the orifice with paper, cloth, foil, or polymeric films, on one side or both sides.

Instant foam can also be extruded into a suitably shaped vented container in order to make instant life jackets or an instant life raft, all of which would be non-sinkable.

Instant foam can be extruded into a closed, vented mold of any size or shape. The foam will knit well to itself and take the size and shape of the container with little or no shrinkage.

Instant foam being of high porosity is especially useful for absorbing oil, and a preferred type of instant foam for absorbing oil, and a preferred type of instant foam for this use is made from styrene/acrylonitrile copolymer, e.g. about 70% by weight styrene and 30% by weight acrylonitrile copolymer. Such a copolymer is less swelled or dissolved by oil, especially the aromatic constituents of oil, than is polystyrene and so better reusable after squeezing out oil or otherwise removing absorbed oil.

Instant foam, especially at higher gas pressures, can be generated under water and used for refloating sunken ships or as a flotation device to carry objects from underwater to the surface.

Instant foams at about 2 lb/ft$^3$ density can be generated on-site and used as energy absorbing foams for air drop deceleration.

The quantitative release of water/surfactant instant foam is best achieved from glass containers, glass coated containers, or containers with other hydrophylic coatings which are wetted with water.

The thermoplastic polymers to which this invention pertains covers a wide range of compositions, and includes, but is not limited to acrylonitrile-butadienestyrene, the acetal resins such as polyoxymethylene, the acrylics such as poly(methacrylate), cellulose acetate, cellulose acetate butyrate, cellulose propionate, the polycarbonates, the soluble polyolefins, polyisobutylene, polybutadiene, butyl rubber, styrene-butadiene, styrene polymers and copolymers, soluble urethanes, and the vinyl polymers and copolymers including polyvinyl acetate and ethylene/vinyl acetate. The present invention has been found to be particularly useful for foams of homogeneous polymers such as polyvinyl acetate, vinyl chloride/vinyl acetate copolymers, polystyrene, styrene, α-methyl styrene styrenebutadiene copolymers, styrene-acrylonitrile copolymers and, to nonhomogeneous polymer systems, i.e. polyblends and graft copolymers, such as high impact polystyrene, acrylonitrilebutadiene-styrene.

It has been found that any number of solvents can be used as the major solvent. It is preferable that the major solvent form a gel with the polymer to be foamed and that it boils at or near 0°C. It was found that methyl ether (b.p. −24.8°C.) and chloromethane (b.p. −24.1°C.) were excellent solvents and gelling agents. These two solvents alone in a range of from 25 to 50% by weight of the polymer, and in combination with minor amounts of other low-boiling solvents, can be used to foam amorphous polymers, such as styrene, styrene-butadiene copolymer rubbers, or the highly polar styrene-acrylonitrile copolymers or polyvinyl acetate.

In order to prevent shrinkage of the foams produced by this invention, whether made of polystyrene or another polymer or copolymer, it is necessary to have a suitable co-solvent whose boiling point is preferably at or near room temperature. The function of this second solvent is to prevent shrinkage by diffusing out of the polymer matrix into the gas space after the foam has been blown and thus supply the pressure required to keep the foam inflated as the low boiling major solvent diffuses fairly rapidly out of the foam. Minor co-solvents of this type include, but are not limited to pentane (including isopentane, cyclopentane, etc.), 1,1-difluoro-1-chloroethane, dichlorofluoromethane, trichlorofluoromethane, etc.

It was found that the proportion of minor solvent could vary from about 3 to about 30% by weight of the polymer. Although the minor solvent in the above range was satisfactory, it was found that from about 10 to about 20% by weight of the polymer produced foams having greatly enhanced properties.

The critical role of a surfactant in the formulation was clearly shown. In the absence of a suitable surfactant and/or water the foam was of very poor quality, and had very large and uneven cells. Furthermore, the foam did not extrude well from the pressure vessel. It was found that a sodium salt of an alkyl aryl polyether sulfonate was quite satisfactory, although other suitable surfactants could be used in the present process.

In homogeneous polymer solutions, such as polystyrene, styrene/acrylonitrile copolymers, or polyvinyl acetate, the use of a finely divided particulate nucleating agent, such as glass microballoons, phenolic microballoons, or finely divided polyethylene, is very beneficial to the production of smaller and more uniform celled foams than obtained with surfactant alone. Of the nucleating agents tested, the glass microballoons appear to be the most generally useful. However, in non-homogeneous polymer systems, i.e. polyblends and graft copolymers such as acrylonitrile-butadienestyrene, the use of a nucleating agent is not beneficial and may, in many instances, be disadvantageous.

The nucleating agents are solids that are readily dispersed in the gelled polymer mixture and apparently serve as centers for bubble formation resulting in uniform fine cells. Preferred are spherical polyethylene powder having a particle size range of from 4 to 40$\mu$, an average particle size of less than 20$\mu$, and a melt index of less than 40; glass hollow spheres having a particle size range of from 10 to 270$\mu$, and an average particle size of approximately 65 microns; and phenolic hollow spheres having a maximum bulk density of 0.105 g./cc. and a particle size range of 2–60 microns. The nucleating agents are used in a range of from 1.5 to 6% by weight based on the solid foam. Somewhat better foams may be obtained at levels of about 3% by weight.

The melt index is a well-established basis for classifying polyethylene and is measured by a simple capillary rheometer as described in ASTM D 1238. See also "Melt Flow of Polyethylene", J. P. Tordella and R. E. Joley, Modern Plastics, Vol. 31, No. 2, page 146 (1953).

Additives may be incorporated in the foamable mixture in small proportions without adverse effects, e.g. plasticizers, flame retardants, dyes, fillers, etc.

In certain applications it may be desirable to supplement the vapor pressure of the foamable composition with a gas such as nitrogen or carbon dioxide. This is conveniently done by adding the supplemental gas to the already charged container, pressurizing it to any desired pressure, e.g. 100 or 400 p.s.i.

in which it is contained with prolonged periods of time between each release.

DESCRIPTION OF THE PREFERRED EMBODIMENTS

The invention is further illustrated by, but not limited to, the following examples.

EXAMPLE 1

Various formulations of foamable compositions were made as follows. Each was prepared in a separate glass pressure bottle (Coke bottle), either of 6.5, 16 or 26 fl. oz. capacity. The polymer (e.g. Lustrex HH-101), the surfactant, and the nucleating agent were added to the tared bottle in weighed amounts. The bottle was chilled in a suitable bath, e.g. acetone-dry ice, to about 0°C. and to it was added the cold, liquefied methyl ether and the cold, liquefied secondary solvent (e.g. Genetron 21 or Freon 11) to the desired weight. Thereupon the bottle was quickly capped and allowed to warm up to ambient temperature. Finally the bottle and its contents were rotated gently until the polymer dissolved. At 25°C. the pressure of the contents was about 60 psig.

Foamable compositions containing the quantities of polymer, surfactant, solvents and nucleating agent, if any, shown below as Samples A–P were prepared.

Foams were prepared by quickly removing the bottle cap from the bottle, with the bottle inverted so that the contents discharged quickly through an opening approximately 0.62 inch in diameter. The properties of the foams are reported below.

FOAMABLE COMPOSITION

| Sample | Lustrex HH-101 (grams) | Triton X-200 (grams) | Methyl Ether (grams) | Genetron 21 Dichlorofluoromethane (grams) | Nucleating Agent Name | Nucleating Agent (g.) | Foam Density (g./cc.) | Closed Cell Content (%) | Cell Size (p.p.i.) | Comp. Strength (p.s.i.g.) |
|---|---|---|---|---|---|---|---|---|---|---|
| A | 157.5 | 12 | 69 | 21 | — | — | 0.014 | 100 | 5–7 | 1.0 |
| B | 157.5 | 12 | 69 | 21 | FN-500** | 2.0 | 0.024 | 20 | 10–20 | 14.5 |
| C | 157.5 | 12 | 69 | 21 | FN-500 | 5.0 | 0.031 | 20 | 15–20 | 25.3 |
| D | 157.5 | 12 | 69 | 21 | FN-500 | 10.0 | 0.038 | 20 | 20–30 | 55.7 |
| E | 52.5 | 4 | 23 | 7 | — | — | 0.043 | 90 | 4–6 | 2.1 |
| F | 52.5 | 4 | 23 | 7 | FN-500 | 2.0 | 0.032 | 85 | 50–60 | 26.0 |
| G | 52.5 | 2 | 15 | 15* | — | — | 0.035 | 100 | 1–2 | — |
| H | 52.5 | 2 | 15 | 15* | FN-500 | 0.5 | 0.033 | 85 | 15–20 | — |
| I | 52.5 | 2 | 15 | 15* | FN-500 | 1.5 | 0.034 | 85 | 10–20 | — |
| J | 52.5 | 4 | 23 | 4 | — | — | 0.021 | 85 | 15–20 | 6.3 |
| K | 52.5 | 4 | 23 | 4 | Glass Microballoons | 1.5 | 0.022 | 100 | 100–150 | 12.2 |
| L | 157.5 | 6 | 69 | 12 | " | 3.0 | 0.030 | 70 | 30–50 | 14.5 |
| M | 157.5 | 6 | 69 | — | " | 3.0 | 0.030 | 70 | 30–40 | — |
| N | 157.5 | 6 | 69 | 12 | " | 2.0 | 0.023 | — | 30–40 | 15.0 |
| O | 157.5 | 6 | 69 | 12 | — | — | 0.021 | 70 | 5–10 | 2.6 |
| P | 157.5 | 6 | 69 | 12 | Phenolic Microballoons | 2.0 | 0.031 | 60 | 20–30 | 16.0 |

*Genetron 142b (1,1-difluoro-1-chloroethane) substituted.
**Polyethylene, micronized, low-density type, marketed by U.S. Industrial Chemical Company (USI).

The shape and size of the foam is determined to a great extent by the discharge outlet in the pressure vessel. Thus, a round outlet produces a cylindrical foam of generally larger diameter than the opening, e.g. a 1 inch diameter outlet produces about a 5 inch diameter foam. Shapes of various cross-sections are obtained by various shaped outlets, e.g. square, rectangular, etc. Foams varying from pudgy cylinders to thin board-like structures, short or long in length, are readily fabricated. Although the foam is usually discharged into air, it may also be discharged into a nonsolvent liquid, e.g. water. The foam may be discharged incrementally (batch wise) from the pressurized vessel Sample N was compared with commercial foamed polystyrene as follows:

|  | "N" | Commercial Product |
|---|---|---|
| Compressive strength (p.s.i.) | 21 | 25–30 |
| Tensile strength (p.s.i.) | 53 | 50–55 |
| Flexural strength (p.s.i.) | 42 | 55–75 |
| Dielectric constant (1000 kc) | 1.04 | 1.02–1.24 |

Lustrex HH-101 is a heat resistant polystyrene molding compound having a tensile strength of 8100 p.s.i. and a deflection temperature under load of 205°F. at 264 p.s.i fiber stress. It is available from Monsanto Company, St. Louis, Mo., and described in their Data Sheet No. 5063C.

Genetron 21 is dichlorofluoromethane and is available commercially from Allied Chemical Company, Morristown, N.J.

Triton X-200 is an aqueous dispersion containing 28% of the sodium salt of an alkyl aryl polyether sulfonate described in the trade bulletin "Triton Surface-Active Agents", 1951, of the Rohm and Haas Company, Philadelphia, Pa.

Microthene FN-500 is a microfine polyethylene powder having spherical particles ranging from 4 to 40μ, with average particle size less than 20μ. It is available from U.S. Industrial Chemicals Co., New York, N.Y., and described in their trade bulletin "Microthene F microfine polyolefins" PTD-40-265: low-density polyethylene, melt index = 22; density = 0.915 g./cc.; bulk density = 17–20 lb./cu. ft. (0.27-0.32 g./cc.), spherical particles with average size <20μ.

Glass Microballoon Spheres IG-101 are hollow bubbles of glass ranging in size from 10 to 270 microns in diameter, with typical average particle size of approximately 65 microns. They are available from the Vistron Corporation, Cleveland, Ohio and described in their product bulletin "Glass Microballoon Spheres, Industrial Grade": sodium borosilicate glass, bulk density = 12–15 lb./cu. ft. (0.19-0.24 g./cc.); true density = 0.34 g./cc.; melting point = 1400°F. (760°C.).

Phenolic Microballoons BJO-0930 is a phenolic resin in the form of minute hollow spheres ranging in size from 2–60 microns and having a maximum bulk density of 0.105 g./cc. (6.5 lb./cu. ft.). It is available from Union Carbide Corporation, Plastics Division, New York, N.Y. and described in their trade bulletin "Bakelite Phenolic—'Microballoon' Spheres," BA-326145C Genetron 142-b is 1,1-difluoro-1-chloroethane and is available commercially from Allied Chemical Corp., Morristown, N.J.

The compression strength was measured on 2×2×1 inch test samples by ASTM 1621, and reported as p.s.i. at 10% deflection.

The density was determined from a measurement of the volume of water displaced.

The closed cell content was determined with a Beckman Air Comparison Pycnometer, Model 930.

Flexural strength was determined by a modification of ASTM-C-203-58 using 8×2×1 inch specimens at 5 inch span and 0.1667 inch per minute head speed.

EXAMPLE 2

For this example, a commercially available flame retardant grade of polystyrene was used.

The process was essentially as described in Example 1, except that the formulation consisted of:

|  | grams |
|---|---|
| Pelaspan 333 | 157 |
| Dimethyl ether | 69 |
| Genetron 21 | 21 |
| Triton X-200 | 6 |
| Glass Microballoons | 3 |

The foam had a density of 0.019 g./cc., a closed-cell content of 50%, a cell size pores per inch (p.p.i.) of 10–20, and a compressive strength of 6 p.s.i.

Genetron 21 is dichlorofluoromethane and is available commercially from Allied Chemical Corp., Morristown, N.J.

Pelaspan 333 FR is a flame retardant spherical bead form of expandable polystyrene, available from The Dow Chemical Company, Midland, Mich. and described in their data sheet on Pelaspan 333 FR, Form No. 171-440-68.

EXAMPLES 3–8

The purpose of these examples is to show the importance of the nucleating agent and the surfactant to the preparation of a satisfactory foam from polystyrene.

The procedure of Example 1 was followed except that each bottle was charged with 150 grams Lustrex HH-101 polystyrene, 16 grams of Genetron 21, 70 grams of methyl ether, from 0 to 3 grams of Glass Microballoons and from 0 to 10 grams of Triton X-200. The results shown in the following tabulation show that the combination of the nucleating agent, surfactant, major solvent and minor solvent is necessary to produce a satisfactory foam.

| Example | Glass Microballoons (grams) | Triton X-200 (grams) | Remarks |
|---|---|---|---|
| 3 | 0 | 0 | Large irregular cells |
| 4 | 3 | 0 | Large irregular cells |
| 5 | 3 | 2 | Extruded poorly, irregular cells |
| 6 | 3 | 4 | Extruded poorly |
| 7 | 3 | 6 | Excellent foam |
| 8 | 3 | 10 | Excellent foam, extruded rapidly Weight of foam after 24 hrs. – 163 grams |

EXAMPLE 9

A one-gallon closed steel cylinder having a threaded fitting, valve and outlet at one end was charged with the following formulation:

|  | grams |
|---|---|
| Lustrex HH-101 | 471 |
| Triton X-200 | 18 |
| Methyl ether | 207 |
| Genetron 21 | 36 |
| Glass Microballoons | 9 |

With a valve of 3/16 in. diameter orifice, the average diameter of foam product was ⅝ in.; with 5/16 in. diameter orifice, ⅞ in.

The generation of the foam was readily controlled by opening and closing the valve. It could be formed continuously as long as there was pressure within the cylinder, or it could be formed intermittently. In this way a foamed structure could be formed by increments.

When the valve outlet was directed under the surface of water, an excellent foam was formed.

EXAMPLE 10

The process was essentially as described in Example 1 except that the formulation consisted of:

|  | grams |
|---|---|
| Lustrex HH-101 | 157 |
| Glass Microballoon spheres | 3 |
| Triton X-200 | 20 |
| Freon 11 | 20 |

| | grams |
|---|---|
| Methyl chloride | 60 |

Freon 11 is trichlorofluoromethane and is available commercially from E. I. duPont de Nemours and Company, Wilmington, Del.

The foam had a smooth, glossy skin that grew slightly after extrusion, but hardened quickly to prevent shrinkage. Thus, it can be seen that one embodiment of this invention comprises using chloronated solvents as the major and minor solvent to make a fire retardant composition.

EXAMPLE 11

The process was essentially as described in Example 1 except that the formulation consisted of:

| | grams |
|---|---|
| Gelva V-25 | 157 |
| Glass Microballoon spheres | 3 |
| Triton X-200 | 20 |
| Freon 11 | 12 |
| Methyl ether | 60 |

Gelva V-25 is polyvinyl acetate resin granules available commercially from Monsanto Company, St. Louis, Mo.

An excellent foam of polyvinyl acetate was obtained. The foam was somewhat rubbery but did not shrink.

EXAMPLE 12

Two samples (A and B) were prepared by the process essentially as described in Example 1, except that the formulations consisted of:

| | Sample A (grams) | Sample B (grams) |
|---|---|---|
| Lustran 710 | 157 | 157 |
| Glass Microballoon spheres | 3 | 3 |
| Triton X-200 | 12 | 6 |
| Freon 11 | 30 | 20 |
| Methyl ether | 80 | 90 |

Lustran 710 is acrylonitrile-butadiene-styrene resin available commercially from Monsanto Company, St. Louis Mo.

The foams obtained upon extrusion were excellent, being very stable; however, when the test was repeated using the above formulations but without the nucleating agent, very little difference could be detected in the quality of the foam.

EXAMPLE 13

For this example, a commercially available styrene/butadiene copolymer was used together with polystyrene.

The process was essentially as described in Example 1, except that the formulation consisted of:

| | grams |
|---|---|
| FR-S-1006 | 51 |
| Lustrex HH-101 | 105 |
| Methyl ether | 75 |
| Triton X-200 | 12 |
| Pentane | 20 |

FR-S-1006 is a copolymer of styrene/butadiene consisting of about 23.5 weight percent of styrene as described in Firestone's Bulletin "Synthetic Rubber Facts. FR-S-1006", Oct. 1, 1963, Firestone Synthetic Rubber and Latex Company, Akron, Ohio.

A high quality rubbery foam was obtained even though the formulation did not contain a nucleating agent. When a nucleating agent was added, the foam quality was not as good, indicating that a nucleating agent is not required with polyblends.

EXAMPLE 14

This example describes the use of a commercially available styrene/acrylonitrile copolymer in the preparation of instant foams. The process was essentially as described in Example 1, except that the formulations were as follows:

| Example | Lustran* A-21 (g.) | Glass Micro-balloons (g.) | Triton X-200 (g.) | Dimethyl Ethyl (g.) | Genetron 21 (g.) |
|---|---|---|---|---|---|
| 1-A | 157.5 | 3 | 12 | 97.5 | 45 |
| 1-B | 157.5 | 3 | 12 | 97.5 | 45 |
| 2-A | 157.5 | 3 | 12 | 69.0 | 42 |
| 2-B | 157.5 | 3 | 12 | 69.0 | 42 |

*Lustran A-21 is a styrene/acrylonitrile copolymer of about 74/26 weight ratio respectively, marketed by Monsanto Company.

BEFORE DECAPPING BOTTLE

1-A - The gel is opaque and grey white. A 15 ml liquid layer is on top of the gel. The gel has 2 phases. The lower phase contains white granules. The drain time is 28 seconds (drain time is the time for the gel to move from one end of the bottle to the other after inversion. No visible separation of nucleating agent was observed.

1-B - Same as 1-A.

2-A - Opaque, grey white gel with no free liquid phase. The gel is very viscous, with a drain time of 28 minutes. Gel is nonuniform with swollen granules throughout gel. Some separation of nucleating agent was observed.

2-B - Same as 2-A - same formulation.

After Extrusion From Bottle

1-A - Foam had a .986 lbs/ft$^3$ density. Cell structure was very irregular with deep voids. A slight shrinkage was observed. Extrusion from the bottle was complete giving a 3' by 4'' diameter log of foam with a short tail ~18'' of smaller diameter.

1-B - Same as 1-A.

2-A - 2.10 lbs/ft$^3$ density foam produced which had an irregular cell structure. Shrinkage was severe. Some voids in the foam were observed. Complete extrusion was obtained. Foam quality was better than in 1-A and B. A small tail of decreased diameter was observed.

2-B - Same as 2-A - same formulation.

The above formulations although operable were not optimum but point the way toward optimum formulations.

Although the invention has been described in terms of specified embodiments which are set forth in considerable detail, it should be understood that this is by way of illustration only, and that the invention is not necessarily limited thereto, since alternative embodiments and operating techniques will become apparent to those skilled in the art in view of the disclosure. Accordingly, modifications are contemplated which can be made without departing from the spirit of the described invention.

We claim:

1. A process for rapidly producing a substantially uniform, solid, cellular thermoplastic article comprises the steps of:
   a. charging a vessel with
      1. a solid thermoplastic amorphous polymer having a solubility parameter between 8.4 and 10.4 and an intrinsic viscosity between 0.5 and 5,
      2. a solvent mixture the major amount of which in the range of from about 25–50% by weight of said polymer boils at or below 0°C. and to prevent shrinkage the minor amount of which in range of from about 3–30% by weight of said polymer boils at or near 20°C., said solvent mixture being capable of forming a gel with the polymer when subjected to super-atmospheric pressure,
      3. water in sufficient amount to lubricate the flow of the gel from the vessel as specified in step (c) below, and
      4. for homogeneous polymer solutions a nucleating agent selected from the group consisting of glass hollow spheres, phenolic hollow spheres and mixtures thereof;
   b. subjecting the contents of the vessel to superatmospheric pressure while at a temperature within the range of room temperature to below the critical temperature of said solvent mixture for time sufficient to form a flowable gel; and,
   c. thereafter rapidly opening an outlet at the bottom of the vessel to cause the gel to flow from the vessel and form the cellular article.

2. A method of claim 1 wherein said water contains a water-soluble surfactant.

3. A process of claim 1 wherein the solid thermoplastic polymer is selected from the group consisting of polyblends and graft copolymers of polystyrene.

4. A process of claim 1 wherein the solid thermoplastic polymer is a homogeneous polymer selected from the group consisting of polystyrene, copolymers of polystyrene and polyvinyl acetate.

5. A process of claim 1 wherein the major solvent is selected from the class consisting of methyl ether and chloromethane.

6. A process of claim 1 wherein the minor solvent is selected from the group consisting of dichlorofluoromethane, 1,1-difluoro-1-chloroethane, and pentane.

7. A process of claim 2 in which the surfactant is an aqueous dispersion of the sodium salt of an alkyl aryl polyether sulfonate.

8. A process of claim 1 in which the nucleating agent is selected from the class consisting of:
   a. glass hollow spheres having a particle size range of from 10 to 270$\mu$, and an average particle size of approximately 65 microns; and
   b. phenolic hollow spheres having a particle size range of from 2 to 60 microns with a maximum bulk density of 0.105 g./cc.

9. A process of claim 2 in which the polymer is polystyrene, the major solvent is methyl ether and the minor solvent is dichlorofluoromethane, the surfactant is an aqueous dispersion of the sodium salt of an alkyl aryl polyether sulfonate, and the nucleating agent is spherical glass microballoons having a particle size range of from 10 to 270$\mu$ and an average particle size of approximately 65$\mu$.

10. A process of claim 2 in which the polymer is polystyrene, the major solvent is methyl ether and the minor solvent is trichlorofluoromethane, the surfactant is an aqueous dispersion of the sodium salt of an alkyl aryl polyether sulfonate, and the nucleating agent is spherical glass hollow spheres having a particle size range of from 10 to 270$\mu$ and an average particle size of approximately 65$\mu$.

11. A process of claim 2 in which the polymer is polystyrene, the major solvent is chloromethane and the minor solvent is dichlorofluoromethane, the surfactant is an aqueous dispersion of the sodium salt of an alkyl aryl polyether sulfonate and the nucleating agent is glass hollow spheres.

12. A process of claim 2 wherein the solid thermoplastic material is a polyblend comprising polystyrene and styrene-butadiene copolymer, the major solvent is methyl ether, the minor solvent comprises pentane, and the surfactant is an aqueous dispersion of the sodium salt of an alkyl aryl polyether sulfonate.

13. A process of claim 2 wherein the polymer is a copolymer of styrene and acrylonitrile, the major solvent is methyl ether, the minor solvent is dichlorofluoromethane, the surfactant is an aqueous dispersion of the sodium salt of an alkyl aryl polyether sulfonate and the nucleating agent is glass hollow spheres.

14. A foamable polymer composition comprising:
   a. a solid thermoplastic amorphous polymer having a solubility parameter between 8.4 and 10.4 and an intrinsic viscosity between 0.5 and 5;
   b. a solvent mixture, the major amount of which in the range of from about 25–50% by weight of said polymer boils at or below 0°C. and to prevent shrinkage the minor amount of which in the range of from about 3–30% by weight of said polymer boils at a near 20°C., said solvent mixture being capable of forming a gel with the polymer when subjected to superatmospheric pressure;
   c. water in sufficient amount to act as a lubricant for the formation of a cellular article from the composition; and,
   d. for homogeneous polymer solutions a nucleating agent selected from the group consisting of glass hollow spheres, phenolic hollow spheres and mixtures thereof.

15. A composition of claim 14 wherein said water contains a water-soluble surfactant.

16. A composition of claim 14 wherein the solid thermoplastic polymer is selected from the group consisting of polyblends and graft copolymers of polystyrene.

17. A composition of claim 14 where the solid thermoplastic polymer is a homogeneous polymer selected from the group consisting of polystyrene, copolymers of polystyrene and polyvinyl acetate.

18. A composition of claim 14 wherein the major solvent is selected from the class consisting of methyl ether and chloromethane.

19. A composition of claim 14 wherein the minor solvent is selected from the group consisting of dichlorofluoromethane, 1,1-difluoro-1-chloroethane and pentane.

20. A composition of claim 15 wherein the surfactant is an aqueous dispersion of the sodium salt of an alkyl aryl polyether sulfonate.

21. A composition of claim 14 in which the nucleating agent is selected from the class consisting of:
   a. glass hollow spheres having a particle size range of from 10 to 270μ, and an average particle size of approximately 65 microns; and
   b. phenolic hollow spheres having a particle size range of from 2 to 60 microns with a maximum bulk density of 0.105 g./cc.

22. A composition of claim 15 in which the polymer is polystyrene, the major solvent is methyl ether and the minor solvent is dichlorofluoromethane, the surfactant is an aqueous dispersion of the sodium salt of an alkyl aryl polyether sulfonate, and the nucleating agent is spherical glass microballoons having a particle size range of from 10 to 270μ and an average particle size of approximately 65μ.

23. A composition of claim 15 in which the polymer is polystyrene, the major solvent is methyl ether and the minor solvent is trichlorofluoromethane, the surfactant is an aqueous dispersion of the sodium salt of an alkyl aryl polyether sulfonate, and the nucleating agent is spherical glass hollow spheres having a particle size range of from 10 to 270μ and an average particle size of approximately 65μ.

24. A composition of claim 15 in which the polymer is polystyrene, the major solvent is chloromethane and the minor solvent is dichlorofluoromethane, the surfactant is an aqueous dispersion of the sodium salt of an alkyl aryl polyether sulfonate and the nucleating agent is glass hollow spheres.

25. A composition of claim 15 wherein the solid thermoplastic material is a polyblend comprising polystyrene and styrene-butadiene copolymer, the major solvent is methyl ether, the minor solvent comprises pentane, and the surfactant is an aqueous dispersion of the sodium salt of an alkyl aryl polyether sulfonate.

26. A composition of claim 15 wherein the polymer is a copolymer of styrene and acrylonitrile, the major solvent is methyl ether, the minor solvent is dichlorofluoromethane, the surfactant is an aqueous dispersion of the sodium salt of an alkyl aryl polyether sulfonate and the nucleating glass hollow spheres.

* * * * *